(12) United States Patent
Benco et al.

(10) Patent No.: US 7,623,634 B2
(45) Date of Patent: Nov. 24, 2009

(54) NETWORK SUPPORT FOR SECURE CALLER ID

(75) Inventors: David S. Benco, Winfield, IL (US);
Sanjeev Mahajan, Naperville, IL (US);
Baoling S. Sheen, Naperville, IL (US);
Sandra Lynn True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 935 days.

(21) Appl. No.: 11/141,101

(22) Filed: May 31, 2005

(65) Prior Publication Data

US 2006/0285668 A1 Dec. 21, 2006

(51) Int. Cl.
*H04M 1/64* (2006.01)
*H04M 1/56* (2006.01)
*H04M 15/06* (2006.01)

(52) U.S. Cl. ............ 379/88.19; 379/88.02; 379/142.06; 455/410; 455/415

(58) Field of Classification Search ............... 379/88.01, 379/88.02, 88.16, 88.18, 88.19, 88.2, 88.21, 379/93.03, 142.01, 142.05, 142.06; 455/416, 455/410
See application file for complete search history.

(56) References Cited

U.S. PATENT DOCUMENTS

| | | | | |
|---|---|---|---|---|
| 5,930,700 A * | 7/1999 | Pepper et al. | ............. | 455/435.3 |
| 6,078,807 A * | 6/2000 | Dunn et al. | ................. | 455/410 |
| 6,445,775 B1 * | 9/2002 | Morganstein et al. | .... | 379/88.02 |
| 6,463,127 B1 * | 10/2002 | Maier et al. | .................... | 379/38 |
| 7,136,458 B1 * | 11/2006 | Zellner et al. | ............ | 379/88.02 |
| 2006/0262908 A1 * | 11/2006 | Chambers et al. | ........ | 379/88.01 |

* cited by examiner

*Primary Examiner*—Binh K Tieu
(74) *Attorney, Agent, or Firm*—Fay Sharpe, LLP

(57) ABSTRACT

A method of supporting a secure caller ID service (22) is provided in connection with a telecommunications network (30). The method includes: processing a call from a calling party to a called party, the called party employing an end user terminal (10) served by a facility (20) of the telecommunications network (30) to receive the call; maintaining a voice sample database (28) containing a plurality of voice samples; sampling the calling party's voice; comparing the sampled voice of the calling party to a voice sample selected from the voice sample database (28); and, communicating to the called party a result based upon an outcome of the comparison.

15 Claims, 2 Drawing Sheets

NETWORK SUPPORT FOR SECURE CALLER ID

FIELD

The present inventive subject matter relates to the telecommunication arts. Particular application is found in conjunction with certain types of telecommunication networks, and the specification makes particular reference thereto. However, it is to be appreciated that aspects of the present inventive subject matter are also amenable to other like applications and/or networks.

BACKGROUND

In telecommunications networks, the caller ID function or service is generally well known. In short, when a call is placed from a calling party to a called party, e.g., over the public switched telephone network (PSTN), if the called party subscribes to the caller ID feature or service, then the called party receives the telephone number of the calling party, e.g., which may be output on a display associated with the called party's end user equipment. However, the caller ID information provided to the called party does not necessarily confirm the identity of the calling party, rather it only indicates the telephone number from which the calling party placed the call.

There are many circumstances where a called party may desire to know or verify the identity of a calling party, e.g., when the called party will be providing personal, sensitive or otherwise private information (e.g., medical, financial, etc.) to the calling party. As can be appreciated, the called party in such instances typically wants to be sure that the calling party to which the information is being given is in fact who they purport to be. As previously indicated, conventional caller ID may not be sufficiently reliable for purposes of identifying the calling party. For example, an imposter may be calling from an someone else's telephone and posing as that individual. Conventional caller ID would simply provide the called party with the telephone number from which the call was placed, thereby falsely indicating that the calling party is the individual being impersonated when in fact the calling party is the imposter.

Previously, various procedures have been developed to verify a calling party's identity. For example, the called party may ask the calling party one or more questions that can only be correctly answered by the individual whose identity is being verified. For example, the calling party may be asked to recite some secret password; or to provide some private personal data such as their social security number or some portion thereof, or their mother's maiden name; or to answer some prearranged questions to which the called party was previously provided the correct answers. However, this approach can have drawbacks. For example, secret passwords may be forgotten by the calling party attempting to verify their identity. Alternately, passwords and/or private personal data may be stolen, inadvertently compromised or otherwise obtained by those who would fraudulently impersonate an individual. Additionally, a calling party may simply wish not to divulge personal information to a called party, or either party may find the process overly burdensome or obtrusive.

Accordingly, a new and improved secure caller ID service and/or feature is disclosed that overcomes the above-referenced problems and others.

SUMMARY

In accordance with one embodiment, a method of supporting a secure caller ID feature is provided in a telecommunications network. The method includes: processing a call from a calling party to a called party, the called party employing an end user terminal served by a facility of the telecommunications network to receive the call; maintaining a voice sample database containing a plurality of voice samples; sampling the calling party's voice; comparing the sampled voice of the calling party to a voice sample selected from the voice sample database; and, communicating to the called party a result based upon an outcome of the comparison.

In accordance with another embodiment, a system for supporting a secure caller ID service in a telecommunications network includes: a facility operatively connected to the telecommunications network, the facility equipped to process a call from a calling party to a called party, the called party using an end user terminal served by the facility; a voice sample database containing a plurality of voice samples; sampling means for selectively sampling the calling party's voice; comparison means that selectively compares the sampled voice of the calling party to a selected voice sample from the voice sample database; and, communication means for selectively communicating to the called party a result based upon an output of the comparison means.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Figure 1:
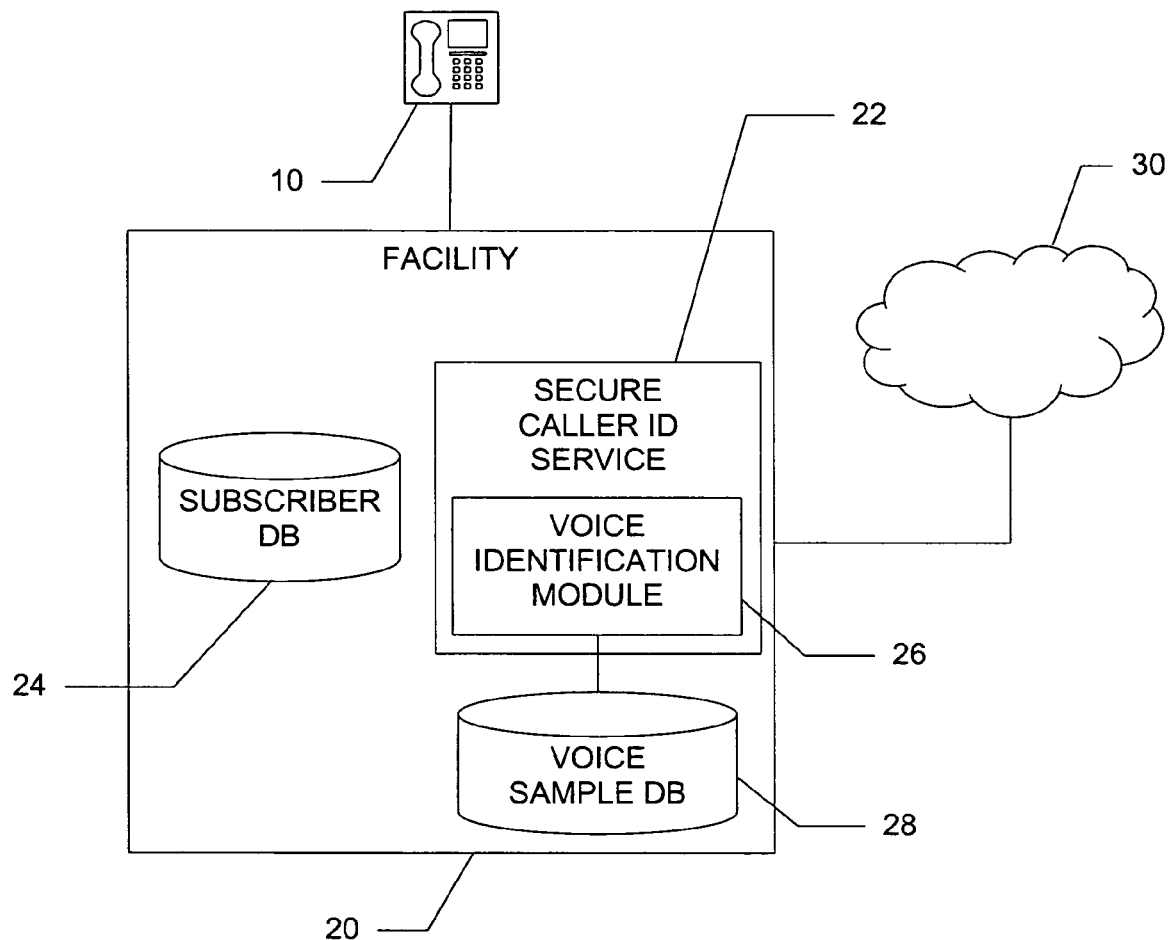
FIG. 1 is a block diagram illustrating an exemplary telecommunications network suitable for practicing aspects of the present inventive subject matter.

With reference to FIG. 1, a user or subscriber uses an end user terminal 10 to selectively place- and/or receive telephone calls over a telecommunications network. Suitably, the terminal 10 is served by a telecommunications facility 20 that is operatively connected to and/or in communication with a public switched telephone network (PSTN) 30 in the usual manner. As shown, the facility 20 is equipped with and/or otherwise has access to a secure caller ID service 22, a subscriber database (DB) 24, a voice identification module (VIM) 26 and a voice sample DB (VSDB) 28. While for simplicity and clarity herein only one terminal 10 and facility 20 are illustrated in the present example, it is to be appreciated that a single facility 20 suitably serves a plurality of similarly situated terminals and that a plurality of such facilities are similarly equipped and/or likewise arranged with respect to the PSTN 30.

For example, in a landline or wireline application, the terminal 10 is optionally a landline telephone or other like end user telecommunication device or landline customer premises equipment (CPE), and the facility 20 serving the terminal 10 is an end office (EO) that is operatively connected to the PSTN 30 in the usual manner. Suitably, the EO includes a telecommunications switch (e.g., a class 5 switch such as the 5ESS or another like switch) to which the terminal 10 is operatively connected in the usual manner, e.g., via a twisted-pair landline cable or the like.

In a wireless or mobile application, e.g., the facility 20 serving the terminal 10 is a mobile switching center (MSC) operatively connected to and/or in communication with the PSTN 30 in the usual manner. Suitably, the MSC is also operatively connected to and/or in communication with a plurality of base stations (not shown) in the usual manner. As is understood in the art, each base station (BS) provides an over-the-air radio frequency interface for its respective geographic area or cell. Selectively, the terminal 10 (which in this embodiment is a mobile or wireless telephone or other appropriate mobile station (MS)) is provided telecommunication services and/or otherwise accesses the network via the interface and/or the BS serving the cell in which the MS is located.

Assuming a called party (e.g., a party receiving a call via the terminal 10) subscribes to a secure caller ID feature, then during the course of processing, connecting and/or otherwise handling calls directed to the terminal 10, the facility 20 employs the secure caller ID service 22 to provide the called party with verification of the calling party's identity using voice samples. It is to be appreciated that the voice samples referred to in the present specification may take the form audio or like signals corresponding to the voice samples themselves, or they may take the form of some other data or information derived from and/or representative of the voice samples or identifying characteristics or features of the voice samples.

As desired by the user or subscriber or as otherwise selected, the terminal 10 (or its user) may or may not have a subscription to or otherwise have activated the secure caller ID feature. For example, the subscriber DB 24 optionally has a list stored therein, and/or otherwise maintains data or information that indicates, which terminals and/or users (e.g., identified by their telephone numbers or other like identifiers) served by the facility 20 do and/or do not subscribe to and/or have activated the secure caller ID feature. Suitably, the subscriber and/or activation status for the terminal 10 is so listed or indicated in the subscriber DB 24.

In operation, the secure caller ID service 22 samples the voice of a calling party. Suitably, the calling party's voice is sampled during an initial period following connection of the call, e.g., during the first few seconds or initial portion of a natural or otherwise ordinary conversation in which the parties partake. That is to say, the calling party simply dials the called party, and when the call is connected (e.g., to the terminal 10 by the facility 20), the parties begin conversing as usual. As the conversation is taking place, the secure caller ID service 22 samples the calling party's voice, suitably without prompting or interruption of the conversation.

Alternately, the secure caller ID service 22 collects a voice sample from the calling party prior to connecting the call. Suitably, when the calling party dials the called party's telephone number, the facility 20 upon receiving the call recognizes (e.g., via the dialed telephone number) that the call is being directed to a terminal (e.g., terminal 10) with an active secure caller ID feature. Accordingly, prior to connecting the call to the terminal 10, the service 22 is invoked and it prompts the calling party to provide a voice sample, e.g., via an audible prompt such as "please provide a voice sample." Optionally, the prompt directs the calling party to recite a selected word, phase or other sound, during which the secure caller ID service 22 collects the sample. Having collected the calling party's voice sample, the call is then connected to the terminal 10 by the facility 20.

The VSDB 28 contains previously stored or recorded voice samples of individuals. The pre-recorded voice samples maintained or stored in the VSDB 28 are optionally obtained in any suitable manner. For example, individuals who opt to permit identity verification via the secure caller ID service 22 can voluntarily provide voice samples to the operator of the facility 20. Suitably, the caller ID service 22 is equipped to and/or otherwise operates in a mode whereby voluntarily submitted voice samples are collected and stored or record in the VSDB 28. Optionally, by dialing a designated telephone number and/or selecting a particular feature code, a calling party is connected to the caller ID service 22 for the purpose of depositing their voice sample in the VSDB 28. Suitably, at or near the time of deposit, the identity of the individual providing the voice sample for the VSDB 28 is verified and/or confirmed using any sufficiently reliable technique. Optionally, the VSDB 28 indexes the voice samples maintained therein by the telephone number of the calling party from which the sample was obtained. That is to say, in the VSDB 28, each voice sample is associated with or stored along with the telephone number of the party or individual to which the voice sample corresponds. Optionally, the name of the individual or other like identifier is also maintained along with their corresponding voice sample in the VSDB 28.

Suitably, the secure caller ID service 22 employs the VIM 26 to determine and/or verify the identity of a calling party. The VIM 26 identifies the calling party and/or performs the identity verification by comparing the sampled voice of the calling party collected by the secure caller ID service 22 with the previously obtained voice samples maintained in the VSDB 28. Optionally, the VIM 26 is implemented using any appropriate voice identification method, technology or system, as is known in the art. A calling party is identified or their identity is verified when the sampled voice of the calling party sufficiently matches one of the voice samples maintained in the VSDB 28.

Optionally, the sampled voice of the calling party collected by the secure caller ID service 22 is compared in turn to each voice sample maintained in the VSDB 28 until a sufficient match is found. Once found, the corresponding name, telephone number or other identifier stored or associated with the matching voice sample in the VSDB 28 is obtained or used by the secure caller ID service 22 as the calling party's ID, which is then optionally provided to the called party, e.g., by transmitting the same to the terminal 10. Of course, if no match is found, the secure caller ID service 22 optionally indicates the same to the called party, e.g., in a message or signal transmitted to the terminal 10.

Alternately, the secure caller ID service 22 accesses the VSDB 28 using the telephone number of the calling party as an index or in like fashion locates the voice sample in the VSDB 28 corresponding to the telephone number of the calling party. If no voice sample is maintained in the VSDB 28 for the telephone number of the calling party, then the secure caller ID service 22 optionally indicates the same to the called party, e.g., in a message or signal transmitted to the terminal 10. Alternately, if a voice sample is maintained in the VSDB 28 for the telephone number of the calling party, then the VIM 26 is invoked or employed to compare the sampled voice of the calling party collected by the secure caller ID service 22 with the located voice sample maintained in the VSDB 28. If the comparison yields a sufficient match, then the identity of the calling party is deemed verified and the secure caller ID service 22 optionally indicates the same to the called party, e.g., in a message or signal transmitted to the terminal 10. Conversely, if the comparison does not yield a sufficient match or there is a sufficient distinction, then the identity of the calling party is deemed not to be valid and the secure caller ID service 22 optionally indicates the same to the called party, e.g., in a message or signal transmitted to the terminal 10. In an optional embodiment, if the comparison yields neither a sufficient match nor a sufficient distinction (i.e., the match remains close but not close enough for a positive ID), then the identity of the calling party is deemed indeterminate and the secure caller ID service 22 optionally indicates the same to the called party, e.g., in a message or signal transmitted to the terminal 10.

Figure 2:
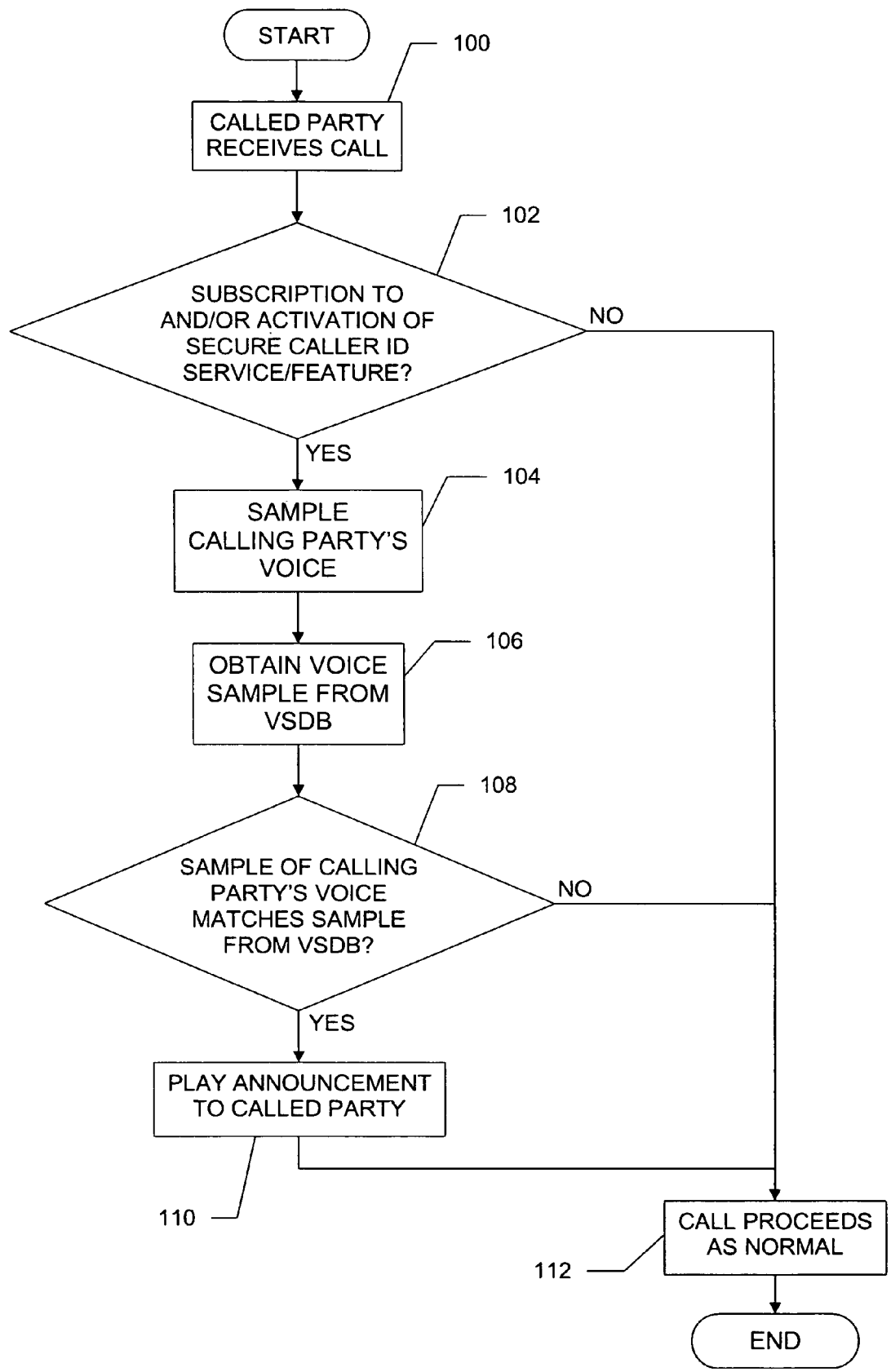
FIG. 2 is a flow chart showing an exemplary secure caller ID process embodying aspects of the present inventive subject matter.

With reference to FIG. 2, an exemplary process illustrating the operation of the secure caller ID service 22 will now be described. The process starts at step 100 with a called party receiving a call from a calling party. For purposes of this example, we shall assume the called party is using the terminal 10 served by the facility 20 to receive the call from the calling party. At decision step 102, the facility 20 determines if the call is to a terminal that has a subscription to and/or activation of the secure caller ID feature. For example, the subscriber DB 24 is optionally queried or otherwise accessed to obtain the pertinent subscription status and/or activation information for the terminal 10 receiving the call.

If at step 102, it is determined that the secure caller ID feature is not subscribed to or activated for the called party or terminal 10, then the secure caller ID service 22 is not invoked and the call proceeds as usual at step 112. Alternately, if at step 102, it is determined that the secure caller ID feature is subscribed to or activated for the called party or terminal 10, then the secure caller ID service 22 is invoked.

Having been invoked, at step 104, the secure caller ID service 22 samples the voice of the calling party. At step 106, the secure caller ID service 22 queries the VSDB 28 with the calling party's telephone number to obtain the corresponding voice sample maintained therein. At decision step 108, the VIM 26 compares the voice samples from steps 104 and 106 with one another. If the comparison yields a sufficient match, then at step 110 the secure caller ID service 22 plays an appropriate announcement to the called party or otherwise transmits or delivers a message or signal to the terminal 10 indicating that the identity of calling party as been verified, and the call goes on to proceed normally at step 112. Conversely, if the comparison does not yield a sufficient match, then the call goes on to proceed normally at step 112 without the secure caller ID service 22 providing the called party with the aforementioned verification of step 110. In this case, when the called party receives no indication, they can take it to mean a negative result of the verification process.

Of course, while not shown, a step similar to step 110 may also optionally be implemented to provide the called party with a negative indication of the verification process when the comparison performed by the VIM 26 in decision step 108 does not yield a sufficient match. As can be appreciated, when such a negative indication step is employed, step 110 may optionally be omitted and the lack of any indication to the called party can be taken by the called party to mean a positive result of the verification process.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of supporting a secure caller ID feature in a telecommunications network, said method comprising:
   (a) processing a call from a calling party to a called party, said called party employing an end user terminal served by a facility of the telecommunications network to receive the call;
   (b) maintaining a voice sample database containing a plurality of voice samples, wherein the plurality of voice samples contained in the voice sample database are associated with telephone numbers of individuals to which the voice samples belong;
   (c) determining a telephone number of the calling party;
   (d) locating a voice sample in the voice sample database associated with the determined telephone number such that the located voice sample is selected from the voice sample database to be compared with the sampled voice of the calling party;
   (e) sampling the calling party's voice;
   (f) comparing the sampled voice of the calling party to the voice sample selected from the voice sample database; and,
   (g) communicating to the called party a result based upon an outcome of the comparison.

2. The method of claim 1, wherein if the outcome of the comparison is a sufficient match, then the result communicated to the called party indicates that the calling party's identity is verified.

3. The method of claim 1, wherein if the outcome of the comparison is not a sufficient match, then the result communicated to the called party indicates that the calling party's identity is not verified.

4. The method of claim 1, wherein the telecommunications network is a public switched telephone network.

5. The method of claim 4, wherein the end user terminal is landline customer premises equipment and the facility is an end office.

6. The method of claim 4, wherein the end user terminal is a mobile station and the facility is a mobile switching center.

7. The method of claim 1, further comprising:
determining if the called party subscribes to the secure caller ID feature; and,
omitting steps (c) through (g) if it is determined that the called party does not subscribe to the secure caller ID feature.

8. The method of claim 1, wherein the step (e) occurs during a period of time after the call has been connected to the end user terminal by the facility.

9. The method of claim 8, wherein the calling party's voice is sampled while the calling party is arbitrarily conversing with the called party via the connected call.

10. A system for supporting a secure caller ID service in a telecommunications network, said system comprising:
a facility operatively connected to the telecommunications network, said facility equipped to process a call from a calling party to a called party, said called party using an end user terminal served by the facility;
a voice sample database containing a plurality of voice samples, wherein the plurality of voice samples contained in the voice sample database are associated with telephone numbers of individuals to which the voice samples belong;
determining means that determine a telephone number of the calling party;
locating means that locate a voice sample in the voice sample database associated with the determined telephone number such that the located voice sample is selected from the voice sample database to be compared with the sampled voice of the calling party;
sampling means for selectively sampling the calling party's voice;
comparison means that selectively compares the sampled voice of the calling party to a selected voice sample from the voice sample database; and,
communication means for selectively communicating to the called party a result based upon an output of the comparison means.

11. The system of claim 10, wherein the telecommunications network is a public switched telephone network.

12. The system of claim 11, wherein the end user terminal is landline customer premises equipment and the facility is an end office.

13. The system of claim 11, wherein the end user terminal is a mobile station and the facility is a mobile switching center.

14. The system of claim 10, wherein the comparison means includes a voice identification module.

15. The system of claim 10, further comprising:
a subscriber database that contains information indicating if the called party subscribes to the secure caller ID service, wherein upon processing a call directed to the called party said facility selectively accesses the subscriber database to determine if the called party subscribes to the secure caller ID service, such that the sampling, comparison and communications means are enabled if it is determined that the called party does subscribe to the secure caller ID service, and the sampling, comparison and communications means are disabled if it is determined that the called party does not subscribe to the secure caller ID service.

* * * * *

UNITED STATES PATENT AND TRADEMARK OFFICE
CERTIFICATE OF CORRECTION

| | |
|---|---|
| PATENT NO. | : 7,623,634 B2 |
| APPLICATION NO. | : 11/141101 |
| DATED | : November 24, 2009 |
| INVENTOR(S) | : Benco et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1212 days.

Signed and Sealed this

Fourteenth Day of December, 2010

David J. Kappos
*Director of the United States Patent and Trademark Office*